United States Patent [19]

Ruholl

[11] Patent Number: 5,081,800
[45] Date of Patent: Jan. 21, 1992

[54] VEHICULAR DEVICE DESIGNED TO OPERATE IN ENCLOSED CANALS

[75] Inventor: Heinz Ruholl, Emsdetten, Fed. Rep. of Germany

[73] Assignee: Heinrich Schlick GmbH, Greven-Reckenfeld, Fed. Rep. of Germany

[21] Appl. No.: 425,476

[22] Filed: Oct. 23, 1989

[30] Foreign Application Priority Data

Oct. 25, 1988 [DE] Fed. Rep. of Germany ....... 3836277
Oct. 25, 1988 [DE] Fed. Rep. of Germany ....... 3836278

[51] Int. Cl.⁵ ............................ B24C 3/06; B62B 3/10
[52] U.S. Cl. ................................... 51/411; 51/415;
51/429; 51/319; 180/7.1; 180/21
[58] Field of Search ........................... 15/340.1, 340.2;
51/429, 410, 411, 317, 319, 424, 428, 432, 433,
415, 416; 180/7.1, 21

[56] References Cited

U.S. PATENT DOCUMENTS

| | | | |
|---|---|---|---|
| 2,089,597 | 8/1937 | Carter | 51/411 |
| 2,176,891 | 10/1939 | Cron | 51/429 |
| 2,358,557 | 9/1944 | Boyd et al. | 51/411 |
| 2,884,745 | 5/1959 | Fritze et al. | 51/411 X |
| 2,951,319 | 9/1960 | Kornhaus | 51/411 |
| 3,058,137 | 10/1962 | Doyle | 51/411 |
| 4,036,173 | 7/1977 | Nicklas | 51/411 |
| 4,064,293 | 12/1977 | Nicklas | 51/411 X |
| 4,537,136 | 8/1985 | Douglas . | |
| 4,603,516 | 8/1986 | Hoffman | 51/429 |

FOREIGN PATENT DOCUMENTS

| | | | |
|---|---|---|---|
| 16680 | 10/1980 | European Pat. Off. | 51/411 |
| 0099819 | 2/1984 | European Pat. Off. . | |
| 2307821 | 9/1973 | Fed. Rep. of Germany . | |
| 2715849 | 5/1978 | Fed. Rep. of Germany . | |
| 3241196 | 5/1983 | Fed. Rep. of Germany . | |
| 3301548 | 7/1984 | Fed. Rep. of Germany . | |
| 3440250 | 5/1985 | Fed. Rep. of Germany . | |
| 8601923 | 8/1986 | Fed. Rep. of Germany . | |
| 42767 | 4/1979 | Japan | 51/411 |
| 0109470 | 6/1984 | Japan | 180/7.1 |
| 0122869 | 6/1987 | Japan | 180/7.1 |
| 0210183 | 9/1987 | Japan | 180/7.1 |
| 0188579 | 8/1988 | Japan | 180/7.1 |
| 112289 | 11/1962 | Pakistan | 51/411 |

Primary Examiner—Bruce M. Kisliuk
Assistant Examiner—John A. Marlott
Attorney, Agent, or Firm—Sprung Horn Kramer & Woods

[57] ABSTRACT

A vehicular device designed to operate in enclosed canals includes a swivel head (25) which is connected by means of a rotatable and/or vertically adjustable boom (manipulator arm) (2) to the front end of a main chassis (3). The main chassis is fitted with rotatable supporting arms (6, 7; 6',7') to which are attached, both above and below and equidistant to the midline of the main chassis, pairs of wheels (8, 8'; 9, 9'; 28, 28', 29, 29'). The supporting arm or arms are maintained by means of a power source (16, 16') in a position of maximal spread in relation to the main chassis.

12 Claims, 4 Drawing Sheets

VEHICULAR DEVICE DESIGNED TO OPERATE IN ENCLOSED CANALS

BACKGROUND OF THE INVENTION The present invention relates to a vehicular device designed to operate in enclosed canals. The device includes a main chassis and a swivel head attached by means of a rotatable arm and/or a vertically adjustable boom (manipulator arm) to the face of this main chassis. The device is equipped with wheels both above and below the main chassis.

Preferably, the device is fitted with a head that is suitable for sand blasting the inner surfaces of closed canals. The head can, however, be fitted with an optical appliance, a gamma-ray radiator, a paint spray gun, an air-cleaner nozzle or with similar equipment, where it is important that, during the forward movement of the vehicle, the head maintains a prescribed distance from the inner surfaces of the canal being traversed.

The European Application No. A-99 819 discloses a self-propelled vehicular device which is intended for operation in enclosed canals that cannot be approached by human beings (in this instance, the canals of atomic reactor facilities). The device has a central chassis to which are attached two rollers below and two others above the chassis. The front part of the chassis is bent forward over the lower rollers and thus achieves a detecting position, so that a detector mounted thereon can be moved along the floor of the canal. BY adjusting the angle of the bent chassis and by means of a slight twisting, a certain maneuverability of the detector is possible. The vehicle is maintained in this position by means of two upper rollers, one of which lies b(R)hind the other along the axis of motion. These upper rollers, which move along the ceiling of the canal, are mounted on two spring-loaded arms interlocked with each other.

The disadvantage of this prior known vehicle is that the central chassis can achieve a particular average distance from the floor of the canal which is determined by the lower rollers. It is true that the upper rollers make possible a degree of control by pressure on the detector. However, allowances for the diameter of the canal cannot generally be made and an adjustment of the main chassis in relation to the center of the canal is not intended or possible.

In order to create a vehicular device for operating in, inspecting, cleaning or sand blasting narrow canal inner surfaces, flat surfaces, ducts or other enclosed cavities which are difficult to pass or to reach, the device must be so designed that the main chassis can be adjusted to the exact midpoint between the upper and lower canal wall. By this is meant for example, canal tubes, aircraft air-intakes, gaseous smoke ducts and such objects whose tubes and gullies display a differing diameter along their length.

Up until now, such canals were cleaned by persons who had to crawl into the canals. Such persons had to be completely enveloped in special suits and supplied from without with air to breathe. This activity was strenuous and posed extraordinary threat to health which could not be reasonably expected of any person over a long Period of time.

SUMMARY OF THE INVENTION

The principal objective of the present invention is to replace the manual sand blasting and similar activities previously carried out by persons by means of a vehicular device that fulfills all the requirements for an even, gentle and effective treatment and cleaning of such surfaces. One especially important objective is that the swivel head, in particular, a sand blasting head, be positioned and moved at a precisely predetermined and exactly maintained distance from the surface to be sand blasted, in order to avoid damage in the form of so-called head crashes. Particularly in the case of aircraft air-intakes, the interior of the canal is formed of extremely thin casing surfaces of only about 0.8 millimeter in thickness.

These objectives, as well as other objectives which will become apparent from the discussion that follows are achieved, according to the present invention, by means of a vehicular device of the aforementioned type which is characterized by having at least two supporting arms attached so as to be able to move in relation to the main chassis. A pair of wheels are attached to each of these, both above and below the main chassis at an equal distance from its midline.

This arrangement of a main chassis between four pairs of wheels insures that the midline of the main chassis is always at exactly the same height between the top and the bottom of the canal. Accordingly, a sand blasting head attached at the height of the main chassis maintains in every direction the same distance from the surface of canal to be cleaned.

Preferably, the supporting arms with the wheels are so suspended that they turn in counter-rotation relative to one another and in relation to the main chassis.

The vehicle is preferably so designed that the main chassis supports at least two supporting arms, each of which has four wheels and that one of the supporting arms lies immediately alongside the attachment of the sand blasting head.

Furthermore, in a preferred embodiment of the invention an exact adjustment of a supporting arm is achieved by means of a power source, the supporting arm being maintained under tension, in relation to the main chassis, at maximal spread. The supporting arm's power source may comprise a torsion spring, a cylindrical spring, any other spring arrangement or even a hydraulic power source.

Instead of wheels, skids or blocks can be employed, whereby the vehicle can be moved passively as well as actively by means of wheels.

In order to keep the work field and the path of the vehicle free of deposited material that is utilized in sand blasting a sweeping device, Preferably a sweeper nozzle or Pair of nozzles, are attached to the front and the back of the vehicle.

For a full understanding of the present invention, reference should now be made to the following detailed description of the preferred embodiment of the invention, and to the accompanying drawings.

DESCRIPTION OF THE PREFERRED EMBODIMENT

Figure 1:
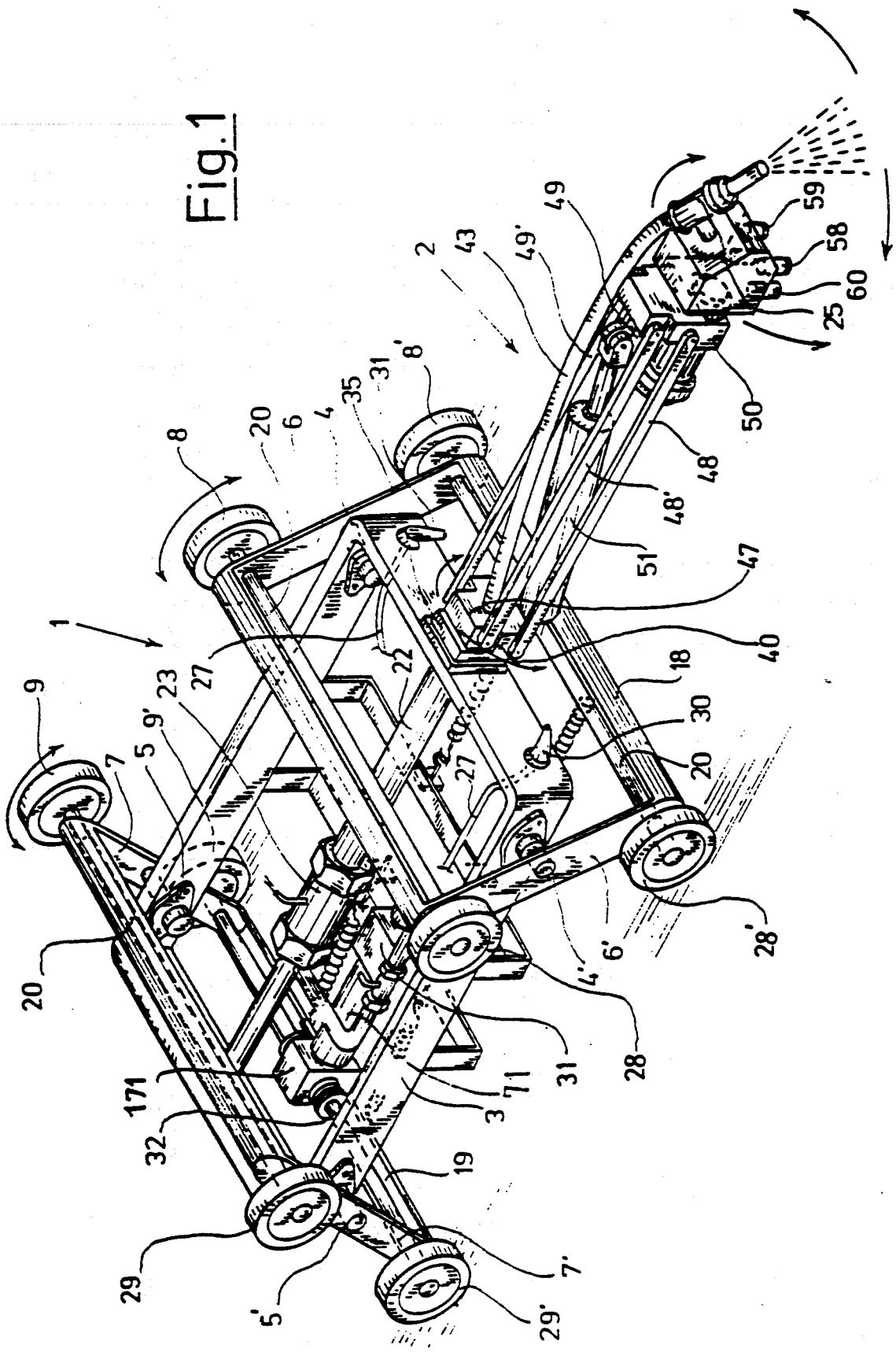
FIG. 1 is a perspective view of the vehicular device according to a preferred embodiment of the present invention.

The vehicular device represented in FIGS. 1 to 4 comprises basically a vehicle 1 with a manipulator arm 2. The length and other dimensions of the vehicle are derived from the dimensions of the canals to be traversed. If the device is utilized, for example, for cleaning aircraft engine air-intakes, the diameter of which changes along its length, the clearance of the rotatable bearing (see below) in the direction of movement is about 75 cm. All other dimensions can accordingly be derived from the illustrated embodiment.

The vehicle 1 consists of a main chassis 3 that, seen from above has the shape of a closed frame. At both outer ends of the main chassis 3 pointing in both directions of motion are attached on both sides rotatable bearings 4 4' and 5 5'. Each of the rotatable bearings 4, 4' and 5, 5' bears at its exact midpoint a supporting arm 6, 6' and 7, 7'. The four supporting arms 6, 6' and 7, 7' bear, in their turn, at each of their ends a wheel 8, 8', 9, 9', 28, 28' and 29, 29', each of which is equipped with a tire of an elastic rubber material. The distance between the wheels attached to a single supporting arms, for example 8 to 8', measured from the opposite crown to crown, is generally greater than the greatest inside diameter of the canal to be cleaned.

The lower ends of the supporting arms 6 and 6', 7 and 7' are connected by means of crossbeams 18 and 19. Furthermore, the axles 20 belonging to the wheels 8, 28 - 8', 28' - 9, 29 - 9', 29' lie parallel to the crossbeams 8 at right angles to the main chassis 3 and provide for reinforcement of the wheel-bearing structure.

Figure 2:
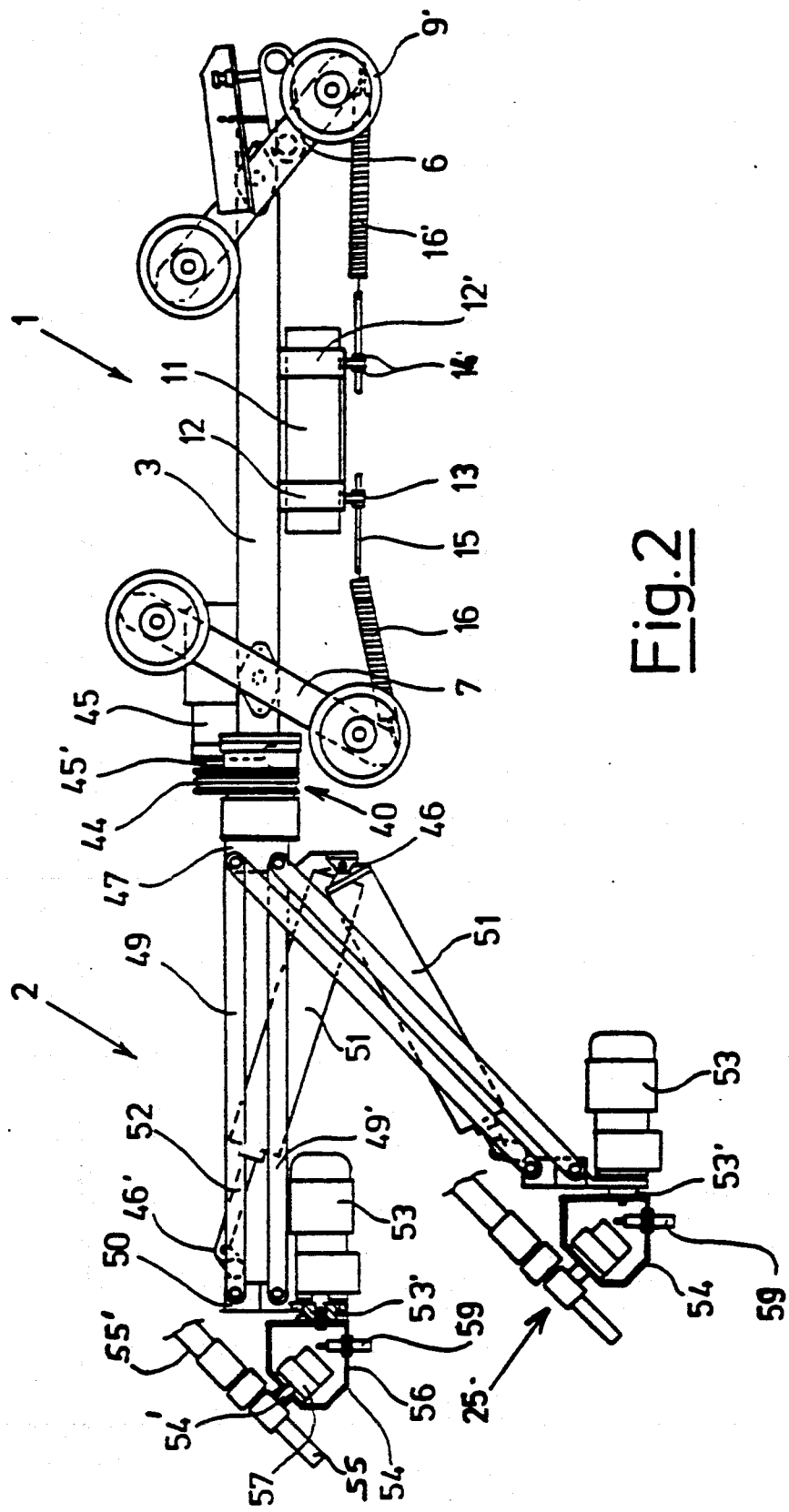
FIG. 2 is a lateral view of the device of FIG. 1.
Figure 3:
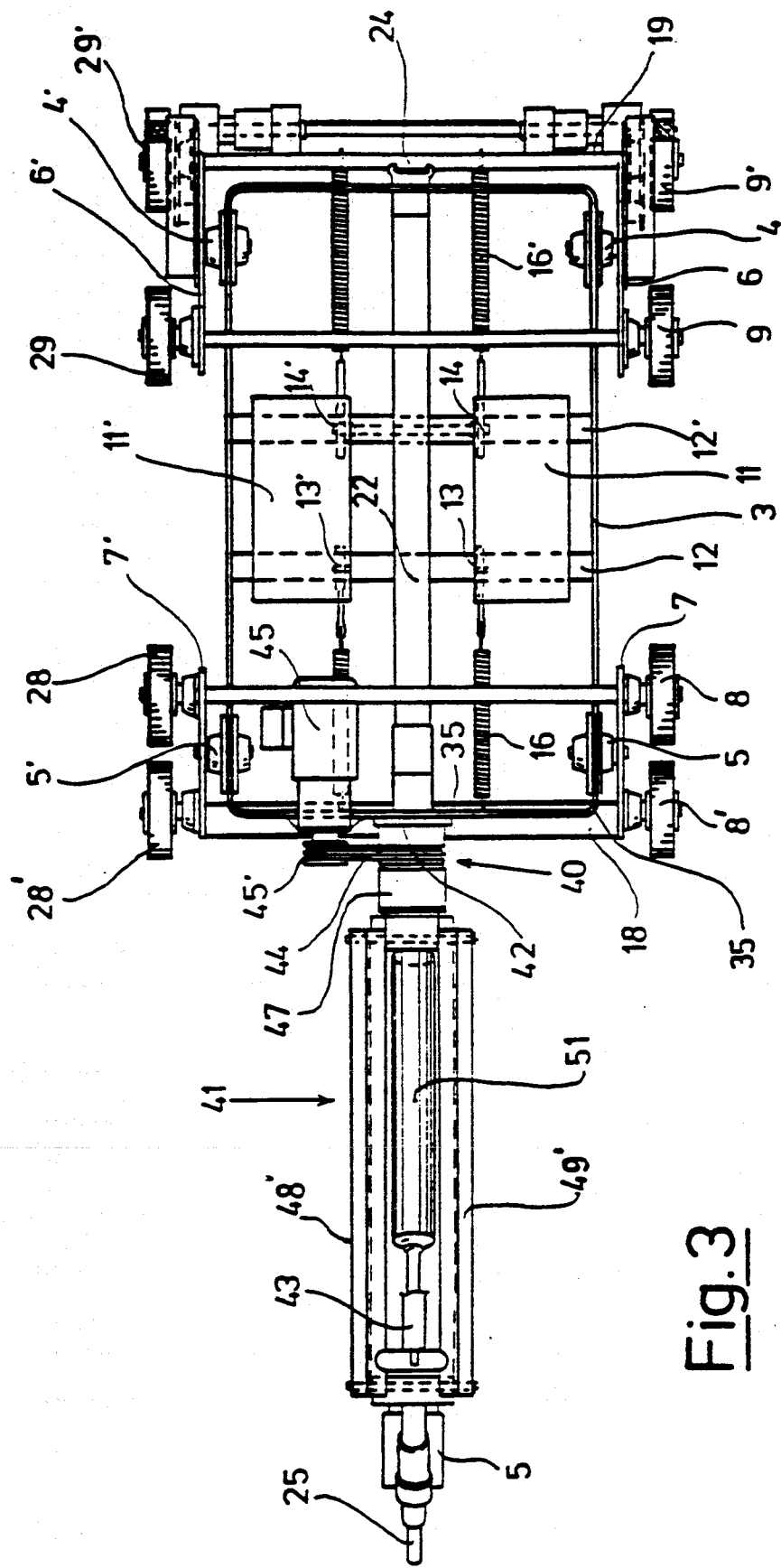
FIG. 3 is a top view of the device of FIG. 1.

Below the main chassis 3 are two terminal boxes 11, 11', which are held in place by means of two curved stays 12, 12'. Attached to these two stays 12, 12' are further two threaded blocks 13, 13' and 14, 14' which project downwards. Through the opening of each of the threaded blocks 13, 13' and 14, 14', respectively, passes a threaded rod 15 which is connected, at its other end, to a cylindrical tension spring 16, 16'. The other end of the tension spring is attached to one of the crossbeams 18 or 19, respectively, whereby each of the two supporting arms belonging to it can be pulled in clockwise or counter-clockwise directions, respectively, until it is arrested by a detent (not represented), as is shown in FIG. 2. A corresponding spring 16' is attached to the rear end of the vehicle and pulls the corresponding supporting arm, respectively 6 or 6', in a clockwise direction. On the other side of the vehicle, corresponding springs work on the supporting arm 6' or 7, as can be seen in a view of the vehicle from above. Thus, the unloaded supporting arms stand at right angles to the horizontal main chassis.

In narrow canals limited by a crown and floor, the supporting arms 6, 6' and 7, 7' are turned in opposite directions when the wheels on their ends, such as 8, 8', come into contact above and below with the inner surface of the canal. Moreover, the main chassis 3 lies exactly in the middle between the upper and the lower wheels so that the distance of the midline of the main chassis to the bottom or the crown of a canal to be traversed remains constant.

The main chassis 3 is traversed in the middle by a central tube 22, which is interrupted at approximately its middle by a branch valve. To keep the FIGS. 2 and 3 simple, this branch valve has not been represented. Furthermore, at the end of the vehicle 1, provision is made for a connection of the central tube 22 to a flexible feeder tube (not shown). The central tube 22 is fed from outside the vehicle with streams of compressed air and a granular blasting material, which are supplied to a blasting device 25 at the end of the manipulator arm 2.

The branch valve 23 is fitted with two steerable branch tubes 27, which lead to two cleaner nozzles 30, 30'; similar cleaner nozzles are also attached to the rear of the vehicle (not visible). The cleaner nozzles 20 serve to clear the work field of left-over blasting material. After completing a predetermined cleaning phase, it is possible to move the blasting material to the end of the canal with the aid of the nozzles and to remove it by known methods. The branch valve is steered by means of a central unit. If needed, compressed air without sand blasting material can be fed to the vehicular device and blown through nozzles 30, 30', by means of this central unit which lies outside the vehicle.

Figure 4:
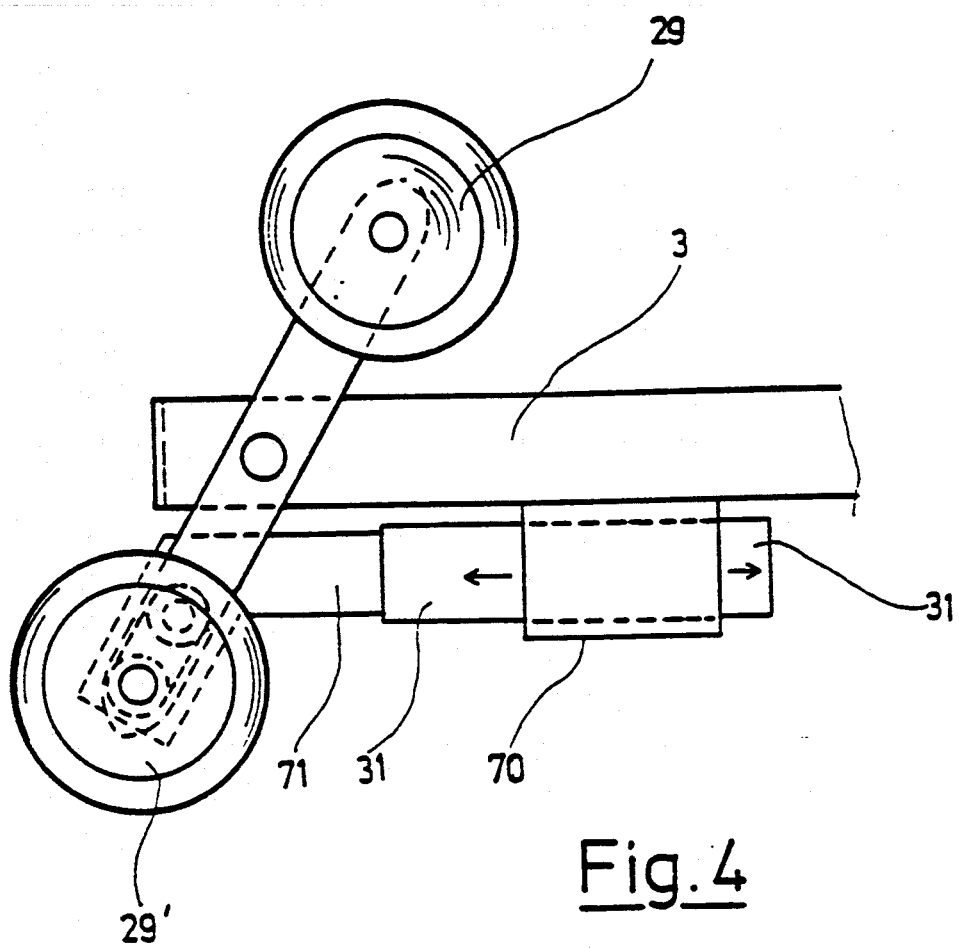
FIG. 4 is a detailed view of the power source of the device of FIG. 1.

The propulsion of the vehicle 1 is effected via the wheels 9' and 29', which are driven by an electric motor 31 that moves these wheels backwards or forewards at varying speeds, according to the commands. As can be seen in FIG. 4, the electric motor 31 lies on a crossbeam 70 and is supported from below. The motor can be moved to and fro along this crossbeam in the directions of the arrows. Torque transmission is effected my means of a transmission 71 that contains a shaft 32. Depending on the angle, the electric motor of the supporting arm 6, 6', which drives the wheels, shifts its Position on the crossbeam 70 and follows in this manner the movement of the supporting arms and the wheels.

Furthermore, a cable supplying energy and steering signals to the vehicle can be attached to the rear end of the vehicle by means of a plug and socket connection. A steering unit 33 is attached to the main chassis, from which emerge cables and other connections to the relevant part of the device. These functions will be described in detail below. The requisite steering leads are well known in the art so that these need not be described in detail.

The Manipulator Arm

A swivel head 40 for the manipulator arm 2 is attached to the vehicle, namely on the front face 30 of the chassis 3. The swivel head 40 is insulated from a base plate 42 and can be turned about its axis. A flexible tube 43 Pierces the base plate and the swivel head, leading to the blasting nozzle. The swivel head 40 is connected via a drive chain to the output shaft 45' of an electric motor 45, as is shown schematically in FIG. 3. In one variant (cf. FIG. ]) the electric motor 45 lies within the main chassis at right angles to the direction of motion and drives the swivel head 40 via a transmission (not shown here). The direction of rotation of the electric motor can be controlled.

A frontal block 47 is attached to the swivel head. To this block are attached two pairs of parallel sliding bars 48, 48' and 49, 49'. The parallel sliding bars 48, 48' and 49, 49' end at a terminal block 50. The upwards and downwards movement of the terminal block 50 with regard to the frontal block 47 takes place via an electrically-driven, threaded-rod drive 51 with its threaded rod 5Z, which is attached externally at the support points 46 and 46' to the configuration of the parallel sliding bars. By the inwards and outwards movement of the threaded rod 52, the terminal block 50 is moved exactly in the vertical plane, maintaining at the same time its alignment with the main chassis 3, as can be seen in the two maneuver positions represented in FIG. 2. An electric motor 53 is flange-mounted to the underside of the terminal block 50. The motor's output drive shaft 53' is connected to a casing 54 which, in its turn, is linked via a bearing to a sand blasting head 25 comprising a nozzle 55 and a cross-over tube 55'. Two proximity detectors 58, 59, which are arranged at right angles to the direction of motion, are installed pointing downwards in the lower casing wall which lies horizontally 56. Two rubber mounts 60 are fitted in the neighborhood of the proximity detectors 58, 59 as a protection against impact. The proximity detectors 58, 59 emit a signal as soon as the front end of the manipulator arm approaches closer to the wall than a certain preset minimal distance. In such a case, the sand blasting head can be tilted or removed.

Description of Operation

With the supporting arms set in the prescribed Position, the device is put into an opening at the front of a canal to be cleaned. At first, the manipulator arm is fixed in alignment with the main chassis. The device is moved forward to the beginning of the surface to be cleaned. The end of the surface to be cleaned is prolonged by means of an extension tube so that the vehicle can be driven so far along the canal that the sand blasting head 25 can sweep over the entire inner surface of the canal.

It will be appreciated that the vehicle 1 can be driven backwards and forwards within a canal. The manipulator arm 2, which is attached to the front end of the vehicle, can carry out many movements as follows:

Axis 1

By means of the electric motor 45, the front block 47 with its attached parallel sliding bars 48, 48' and 49, 49' can be turned in both directions of rotation through 360 degrees.

Axis 2

With the aid of the electric linear drive via the threaded rod drive 51 with the threaded rod 52, the terminal block 50 can be moved up and down without altering its exact vertical position. In this manner the clearance distances between the blasting nozzle 25 and the surface to be cleaned can be adjusted.

Axis 3

A rotatable module comprising the electric motor 53 and the casing 54 continuously adapts itself automatically and in fine adjustment to the contours of the surface to be cleaned. The blasting nozzle is thus always oriented at an angle of 45 degrees, or some other predetermined angle, with respect to the surface.

Axis 4

The sand blasting head 25 with its nozzle 55 is driven by a pivot drive 57, that moves the nozzle in regular oscillating motions. In this manner, a spray width of, for example, 300 mm can be achieved. The spray width itself is limited by the requirement for evenness and can be preset by means of the adjustable oscillation angle.

The movements about the axes 2 and 3 of the aforementioned motion systems function automatically; they are controlled by self-propelled steering equipment. This is the purpose of the proximity detectors 58, 59 attached to casing 54.

After switching on, the device lowers the manipulator arm 2 by means of the movement of the threated rod drive slowly downwards until the minimal clearance of a proximity detector from the surface has been exceeded. As soon as this proximity detector (58 or 59) emits a signal, the threaded rod drive and the rotatable module - that is, the electric motor 53—begins to rotate the casing with the proximity detectors. The rotation is always such that the neighboring proximity detector is moved towards the surface. To each of the proximity detectors is thus allocated a particular direction of rotation of the electric motor 53. When the second proximity detector responds, the manipulator arm is withdrawn until one of the proximity detectors ceases to emit a signal. Subsequently, a rotational movement follows in the direction in which the other proximity detector again responds. Should both detectors respond simultaneously, the manipulator arm 2 moves upwards and increases the distance between the nozzle 25 and the surface again. By means of this regulation via two proximity detectors 58 and 59, it is possible for the manipulator arm to follow the surface exactly and to allow a very precise sand blasting.

By means of the constant undulating movement of the nozzle in the bearing 54, a strip about 300 mm wide is carefully cleaned.

Having driven along and cleaned this strip, the vehicle eventually reaches the end of the canal. BY regulating the rotatable section by means of the electric motor 45, the manipulator arm is rotated. The vehicle travels again to the beginning of the canal strip to be cleaned and senses independently the vault of the canal. At the same time, the oscillation width can, according to such requirements as paint thickness or fragility, be adjusted from the outset to differing rotational angles. During the following passage, the rotational angle is so altered that another strip is sand blasted.

Various granulates or other materials known in the art can be utilized in the sand blasting.

It will be apparent that with this tool it is possible to clean a canal surface without causing damage to the most difficult vaultings. Attention is also drawn to the fact that parts of the device projecting outwards that could possibly come into contact with the inner walls of a canal are preferably covered with a foam-upholstery material.

Instead of a sand blasting head, optical equipment, a gamma radiation element, a paint sprayer, an air-cleaning nozzle or similar such tools can be employed, in all instances in which it is necessary that these units maintain in operation a constant clearance from a particular surface.

There has thus been shown and described a novel vehicular device designed to operate in enclosed canals which fulfills all the objects and advantages sough therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. A vehicular device designed to operate inn enclosed canals, comprising, in combination:

(a) a main chassis having a longitudinal centerline;
(b) a swivel head connected to the front end of the main chassis by means of an adjustable manipulator arm;
(c) at least two pairs of supporting arms rotatably attached at their midpoints to the main chassis and extending above and below the main chassis; said pairs of supporting arms being so supsended from the main chassis that, relative to one another and in relation to the main chassis, they move in opposite rotational directions; and
(d) vehicle wheels attached to the supporting arms at exactly the same distance above and below said centerline of the main chassis, the distance of said wheels from said centerline being variable by the rotational movement of said supporting arms.

2. The vehicular device according to claim 1, wherein one of the supporting arms lies in the immediate neighborhood of the attachment point of the swivel head.

3. The vehicular device according to claim 1, wherein the supporting arms are maintained by means of a power source in a position of maximal spread in relation to the main chassis.

4. The vehicular device according to claim 3, wherein the power source is a cylindrical spring.

5. The vehicular device according to claim 1, wherein at least one of the lower wheels is power driven.

6. The vehicular device according to claim 1, wherein the swivel head is fitted with a blasting nozzle.

7. The vehicular device according to claim 6, wherein the blasting nozzle is attached too a oscillation drive.

8. The vehicular device according to claim 1, further comprising a sweeping apparatus.

9. The vehicular device according to claim 8, wherein the sweeping apparatus includes at least one nozzle aimed at the path of the vehicular device.

10. The vehicular device according to claim 1, wherein the manipulator arm is fitted with a terminal unit that includes motor drive means for rotating the swival head, and wherein at least two proximity detectors are arranged close to the head and directed towards the canal surface, the detectors being linked to an automatic control system which steers the drive for the head's rotational motor.

11. The vehicular device according to claim 10, wherein the manipulator arm includes a swivel joint and a parallel sliding bar device, the swivel head being disposed at the end of the sliding bar device.

12. The vehicular device according to claim 11, wherein the parallel sliding bar device comprises a frontal block, at least two parallel sliding bars and a terminal block.

* * * * *